US010169236B2

(12) United States Patent
Salisbury et al.

(10) Patent No.: US 10,169,236 B2
(45) Date of Patent: Jan. 1, 2019

(54) CACHE COHERENCY

(71) Applicant: ARM LIMITED, Cambridge (GB)

(72) Inventors: Sean James Salisbury, Appley Bridge (GB); Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 69 days.

(21) Appl. No.: 15/133,341

(22) Filed: Apr. 20, 2016

(65) Prior Publication Data

US 2016/0350220 A1  Dec. 1, 2016

(30) Foreign Application Priority Data

Jun. 1, 2015 (GB) .................................. 1509423.8

(51) Int. Cl.
*G06F 12/08* (2016.01)
*G06F 12/0817* (2016.01)
*G06F 12/0813* (2016.01)

(52) U.S. Cl.
CPC ...... *G06F 12/0817* (2013.01); *G06F 12/0813* (2013.01); *G06F 2212/1016* (2013.01)

(58) Field of Classification Search
CPC .... G06F 12/082; G06F 12/0817; G06F 12/12; G06F 12/0833; G06F 12/0815; G06F 12/0897; G06F 12/0811; G06F 12/121; G06F 2212/1016; G06F 2212/283; G06F 2212/1044; G06F 12/08; G06F 12/0813; G06F 9/3834
USPC ......................................................... 711/119
See application file for complete search history.

(56) References Cited

U.S. PATENT DOCUMENTS

| | | | |
|---|---|---|---|
| 6,584,550 B1 | 6/2003 | James | |
| 7,240,160 B1 | 7/2007 | Hetherington et al. | |
| 9,244,845 B2 * | 1/2016 | Rowlands | G06F 12/0831 |
| 2002/0065991 A1 * | 5/2002 | Fortuna | G06F 12/0837 |
| | | | 711/141 |
| 2003/0079086 A1 * | 4/2003 | Shanahan | G06F 12/082 |
| | | | 711/133 |
| 2006/0271742 A1 | 11/2006 | Clark et al. | |
| 2007/0055826 A1 * | 3/2007 | Morton | G06F 12/0817 |
| | | | 711/141 |

(Continued)

OTHER PUBLICATIONS

Search Report for GB1509423.8 dated Dec. 18, 2015, four pages.

*Primary Examiner* — Hashem Farrokh
(74) *Attorney, Agent, or Firm* — Nixon & Vanderhye P.C.

(57) ABSTRACT

A cache coherency controller comprises a directory indicating, for memory addresses cached by one or more of a group of one or more cache memories connectable in a coherent cache structure, which of the cache memories are caching those memory addresses; and control circuitry configured to detect a directory entry relating to a memory address to be accessed so as to coordinate, amongst the cache memories, an access to a memory address by one of the cache memories or a coherent agent in instances when the directory entry indicates that another of the cache memories is caching that memory address; the control circuitry being responsive to status data indicating whether each cache memory in the group is currently subject to cache coherency control so as to take into account, in the detection of the directory entry relating to the memory address to be accessed, only those cache memories in the group which are currently subject to cache coherency control.

17 Claims, 5 Drawing Sheets

(56) References Cited

U.S. PATENT DOCUMENTS

| | | |
|---|---|---|
| 2010/0146209 A1 | 6/2010 | Burger et al. |
| 2010/0180084 A1* | 7/2010 | Cypher ............... G06F 12/0817 |
| | | 711/135 |
| 2014/0052930 A1* | 2/2014 | Gulati ..................... G06F 11/22 |
| | | 711/141 |
| 2015/0052313 A1* | 2/2015 | Ghai ....................... G06F 9/467 |
| | | 711/136 |

* cited by examiner

CACHE COHERENCY

This application claims priority to GB Patent Application No. 1509423.8 filed 1 Jun. 2015, the entire content of which is hereby incorporated by reference.

BACKGROUND

This disclosure relates to cache coherency.

Some so-called cache coherent systems, in which consistency is maintained or at least monitored across multiple potential copies of the same data, make use of cache coherency controllers such as snoop filters. A cache coherency controller, or "point of coherence" or "home node" is responsible for overseeing accesses to memory addresses and may use a so-called snoop filter for checking whether a cached version of a memory address to be accessed is held by another cache in the cache coherent system.

In order to avoid making unnecessary snoop enquiries, a snoop filter may maintain a directory indicating which memory addresses are held by which caches in the system. Such a directory may be inclusive, in that it attempts to store all of that information for all of the caches. As an example, an m-way associative structure may be provided for such a directory.

If an entry relating to a new cache access needs to be written into a region of the associative directory for which all of the ways are currently occupied, one entry needs to be deleted. In order to maintain the inclusive nature of the directory, this then involves the cache coherency controller instructing the relevant cache(s) to delete their correspondingly cached lines. This process may be referred to as a back invalidation. Back invalidations for correctly operating caches are generally undesirable as they can reduce the likelihood of cache hits, increasing the delay and power requirements for memory accesses.

SUMMARY

In an example arrangement there is provided a cache coherency controller comprising:

a directory indicating, for memory addresses cached by one or more of a group of one or more cache memories connectable in a coherent cache structure, which of the cache memories are caching those memory addresses; and control circuitry configured to detect a directory entry relating to a memory address to be accessed so as to coordinate, amongst the cache memories, an access to a memory address by one of the cache memories or a coherent agent in instances when the directory entry indicates that another of the cache memories is caching that memory address;

the control circuitry being responsive to status data indicating whether each cache memory in the group is currently subject to cache coherency control so as to take into account, in the detection of the directory entry relating to the memory address to be accessed, only those cache memories in the group which are currently subject to cache coherency control.

In another example arrangement there is provided a cache coherency controller comprising:

means for storing a directory indicating, for memory addresses cached by one or more of a group of one or more cache memories connectable in a coherent cache structure, which of the cache memories are caching those memory addresses; and means for detecting a directory entry relating to a memory address to be accessed so as to coordinate, amongst the cache memories, an access to a memory address by one of the cache memories or a coherent agent in instances when the directory entry indicates that another of the cache memories is caching that memory address;

the means for detecting being responsive to status data indicating whether each cache memory in the group is currently subject to cache coherency control so as to take into account, in the detection of the directory entry relating to the memory address to be accessed, only those cache memories in the group which are currently subject to cache coherency control.

In another example arrangement there is provided a cache coherent data communication device comprising a cache coherency controller as defined above.

In another example arrangement there is provided a memory system comprising:

a cache coherent data communication device as defined above; and a group of one or more cache memories each connected to the cache coherent data communication device.

In another example arrangement there is provided a method comprising:

storing a directory indicating, for memory addresses cached by one or more of a group of one or more cache memories connectable in a coherent cache structure, which of the cache memories are caching those memory addresses; and detecting a directory entry relating to a memory address to be accessed so as to coordinate, amongst the cache memories, an access to a memory address by one of the cache memories or a coherent agent in instances when the directory entry indicates that another of the cache memories is caching that memory address;

the detecting step being responsive to status data indicating whether each cache memory in the group is currently subject to cache coherency control so as to take into account, in the detection of the directory entry relating to the memory address to be accessed, only those cache memories in the group which are currently subject to cache coherency control.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
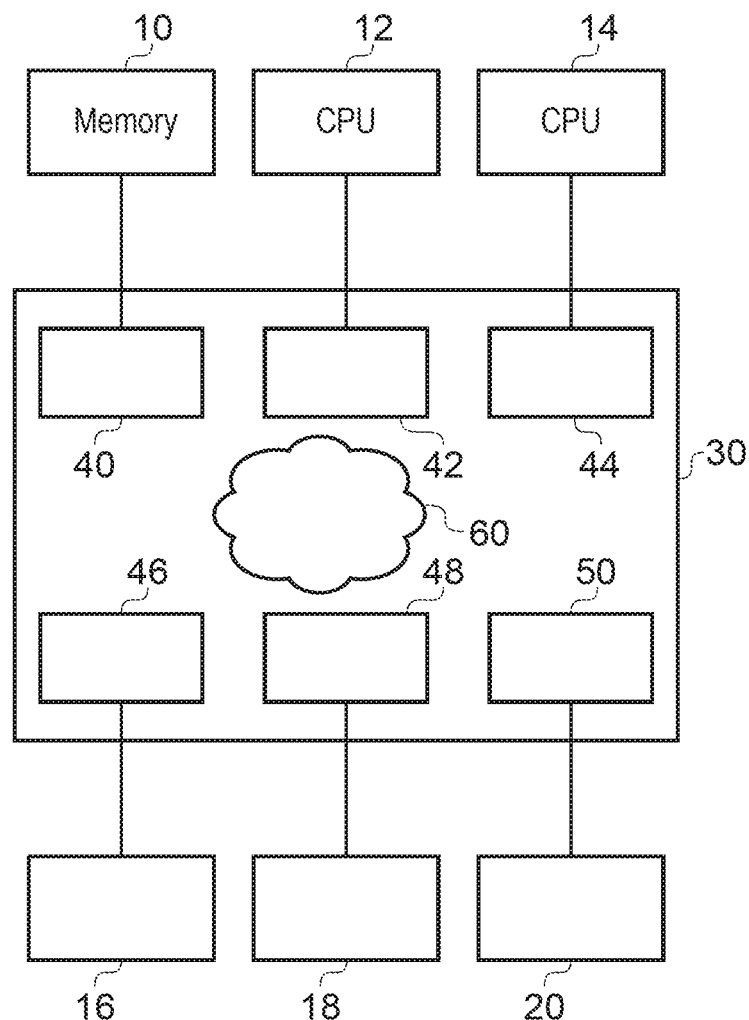
FIG. 1 schematically illustrates a data processing apparatus.

Before discussing the embodiments with reference to the accompanying figures, the following description of embodiments is provided.

An example embodiment provides a cache coherency controller comprising:

a directory indicating, for memory addresses cached by one or more of a group of one or more cache memories connectable in a coherent cache structure, which of the cache memories are caching those memory addresses; and control circuitry configured to detect a directory entry relating to a memory address to be accessed so as to coordinate, amongst the cache memories, an access to a memory address by one of the cache memories or a coherent agent in instances when the directory entry indicates that another of the cache memories is caching that memory address;

the control circuitry being responsive to status data indicating whether each cache memory in the group is currently subject to cache coherency control so as to take into account, in the detection of the directory entry relating to the memory address to be accessed, only those cache memories in the group which are currently subject to cache coherency control.

When a caching agent or cache memory is removed from a coherency domain, for example to power down, in some instances that agent flushes its cache and so removes all its associated entries from a snoop filter directory. But in a case where this does not occur, either through poor power management software or the caching agent not signaling a previous cache eviction, it can lead to stale (out of date) entries in the snoop filter relating to caching agents that are no longer part of the coherency domain and can no longer be snooped. In examples of inclusive snoop filters this can lead to capacity conflict issues requiring a back invalidation to remove cache lines from caches to allow new allocations (new directory entries to be written).

The present arrangements address this issue. When a new coherent access to the snoop filter is a hit to an existing cache line, references to the caching agent no longer in the coherency domain are not taken into account. This requires no additional snoop filter accesses; saving power and snoop filter access bandwidth. In examples, the snoop vector returned from the snoop filter for the original access now only indicates caching agents still enabled in the coherency domain.

In example embodiments, the control circuitry is responsive to the status data indicating whether a cache memory in the group is currently subject to cache coherency control so as to disregard, in the detection of which cache memories are caching the memory address to be accessed, any indications in the respective directory entry relating to the memory address to be accessed, of a cache memory which is not currently subject to cache coherency control.

The present arrangements can provide a convenient way of cleaning the directory of entries relating to cache memories no longer under cache coherency control, by the control circuitry being configured to generate a replacement directory entry based only on those cache memories in the group which are currently subject to cache coherency control.

In example embodiments, the directory provides m possible entries configured to store an indication, in respect of a particular memory address, of which cache memories are caching that memory address, where m is greater than 1. For example, the directory may be m-way associative so that multiple memory addresses map to an associative set of m directory entries. In such cases, the present arrangements can provide a useful technique of avoiding the need for back invalidations if, for example, only a cache memory which is no longer under cache coherency control is detailed in an entry in the directory. In example embodiments the control circuitry is configured to detect, in respect of a memory address to be newly cached, whether a directory entry is available for storage of an indication of which of the one or more cache memories are caching that memory address. In embodiments the control circuitry is configured so that when all of the set of m directory entries mapped to that memory address are occupied, the control circuitry is configured to select one of the set of m directory entries as a directory entry to be overwritten and the corresponding cached information to be invalidated, the control circuitry being configured to select a directory entry to be overwritten, from the set of m directory entries, in dependence upon which of the group of one or more cache memories is indicated by that directory entry. But in examples of the present arrangements, for a directory entry occupied only by one or more cache memories which are not currently subject to cache coherency control, the control circuitry is configured to treat that directory as unoccupied.

Example arrangements, for example using a so-called snoop vector, provide that each directory entry comprises information derived from the respective cached memory address and information indicating, for each cache memory in the group of cache memories, whether that cache memory is currently caching that memory address.

An elegantly convenient example way of implementing the present arrangements is that the control circuitry is configured, in response to the status data, to apply a filter to the information in a directory entry indicating for each cache memory in the group of cache memories, whether that cache memory is currently caching that memory address, so as to pass only those indications relating to cache memories which are currently subject to cache coherency control.

As an example of at least a part of a directory entry, the indication indicating, for each cache memory in the group of cache memories, whether that cache memory is currently caching that memory address, comprises a respective data item for each cache memory in the group. In this case, the filter may be configured to pass only those data items corresponding to cache memories which are currently subject to cache coherency control. For example, each data item may comprise one data bit; and the filter may comprise a logical combination of the data bits corresponding to the group of cache memories with a set of data bits each indicating whether a respective cache memory is currently subject to cache coherency control.

Another example embodiment provides a cache coherency controller comprising:

means for storing a directory indicating, for memory addresses cached by one or more of a group of one or more cache memories connectable in a coherent cache structure, which of the cache memories are caching those memory addresses; and means for detecting a directory entry relating to a memory address to be accessed so as to coordinate, amongst the cache memories, an access to a memory address by one of the cache memories or a coherent agent in instances when the directory entry indicates that another of the cache memories is caching that memory address;

the means for detecting being responsive to status data indicating whether each cache memory in the group is currently subject to cache coherency control so as to take into account, in the detection of the directory entry relating to the memory address to be accessed, only those cache memories in the group which are currently subject to cache coherency control.

An example embodiment provides a cache coherent data communication device (such as a network on chip device or a cache coherent interconnect comprising a cache coherency controller as defined above.

Another example embodiment provides a memory system comprising:

a cache coherent data communication device as defined above; and a group of one or more cache memories each connected to the cache coherent data communication device.

Another example embodiment provides a method comprising:

storing a directory indicating, for memory addresses cached by one or more of a group of one or more cache memories connectable in a coherent cache structure, which of the cache memories are caching those memory addresses; and detecting a directory entry relating to a memory address to be accessed so as to coordinate, amongst the cache memories, an access to a memory address by one of the cache memories or a coherent agent in instances when the directory entry indicates that another of the cache memories is caching that memory address;

the detecting step being responsive to status data indicating whether each cache memory in the group is currently subject to cache coherency control so as to take into account, in the detection of the directory entry relating to the memory address to be accessed, only those cache memories in the group which are currently subject to cache coherency control.

Example arrangements may be implemented as, for example, a cache coherent data communication device (such as an interconnect or a network on chip (NoC) device) comprising a cache coherency controller as defined above.

Example arrangements may be implemented as a memory system comprising:

a cache coherent data communication device as defined above; and a group of one or more cache memories each connected to the cache coherent data communication device.

Referring now to the drawings, FIG. 1 schematically illustrates a data processing apparatus comprising: a plurality of data handling nodes 10, 12, 14, 16, 18, 20 and interconnect circuitry 30 connected to the plurality of data handling nodes. The interconnect circuitry comprises a plurality of interfaces 40, 42, 44, 46, 48, 50 each associated with a respective one of the data handling nodes, and data routing circuitry 60 for controlling and monitoring data handling transactions as between the various data handling nodes.

The data handling nodes 10 . . . 20 can be various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. Some of the data handling nodes may be configured as master nodes, and some as slave nodes, with the master/slave distinction indicating which nodes have control of data handling transactions as between those nodes.

The data processing apparatus of FIG. 1 may be implemented as a single integrated circuit, for example as a so-called system on a chip (SoC). Alternatively, the data processing apparatus of FIG. 1 may be implemented as multiple discrete and interconnected systems.

The interconnect circuitry is an example of a cache coherent data communication device. Another example (not shown, but considered as an embodiment of the present technology) is a so-called network on chip (NoC) system. The arrangement of FIG. 1 is an example of a memory system comprising: a cache coherent data communication device; and a group of one or more cache memories each connected to the cache coherent data communication device.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a memory device as one of the data handling nodes (such as the node 10). Other nodes (such as the nodes 12, 14) may be processing elements having their own respective caches which, depending on the nature of the processing element operations, may store one or more copies of data which is also held in the memory 10. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. The data routing circuitry 60 includes various mechanisms and circuitry to provide for coherent operation. Examples of these will be discussed below.

Figure 2:
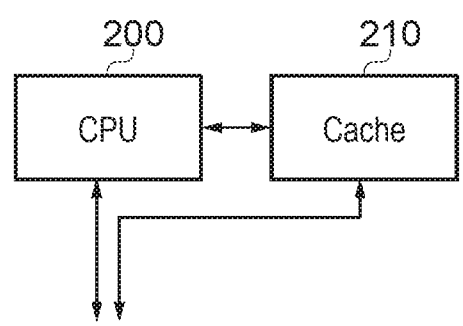
FIG. 2 schematically illustrates a data processing element and associated cache.

FIG. 2 schematically illustrates an example node in the arrangement of FIG. 1. In this example, a CPU 200 makes reference to data stored in an associated cache memory 210, with both the CPU 200 and the cache memory 210 being in communication with the interconnect circuitry 30. The cache memory 210 stores copies of information held in the memory 10. In some instances, the two copies can be the same, for example if a copy has been cached during a memory read operation. In other instances, circumstances could arise which would lead to copies differing from one another, for example if a data write operation has been carried out by the CPU 200 with respect to the copy of a data item stored in the cache 210. In a system of multiple caches, there is a need to ensure that before one version of a data item is accessed, any changes which have been implemented in respect of other versions are fully implemented for all copies.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this will be discussed below.

Figure 3:
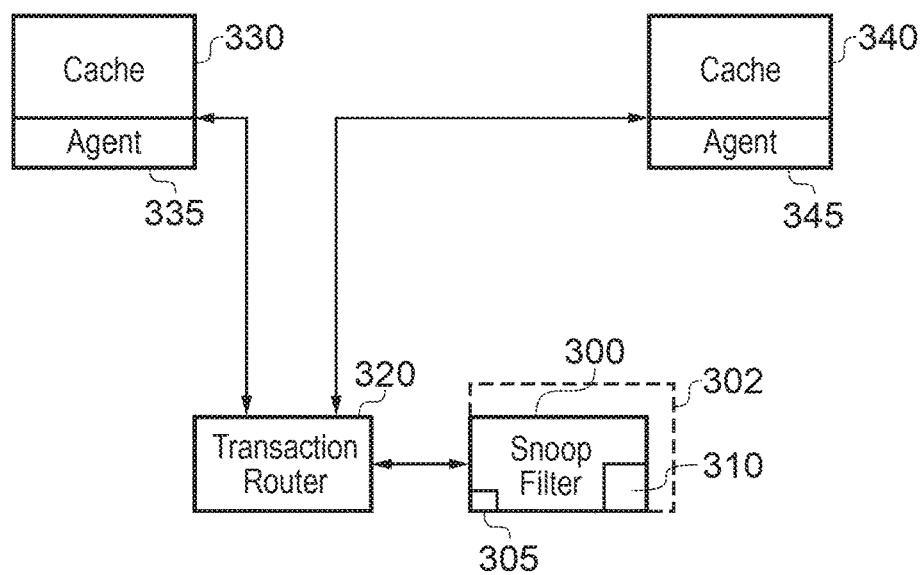
FIG. 3 schematically illustrates the operation of a cache coherency controller.

FIG. 3 schematically illustrates the operation of a cache coherency controller including a snoop filter.

The term "snoop filter" is a historical one and is used here to refer to a control device having an associated "directory", where the directory stores information indicating which data is stored in which cache, and the snoop filter itself at least contributes to the handling of data accesses to cached information so as to provide a cache coherence function.

The cache coherency controller includes the snoop filter in the present embodiments. The cache coherency controller may optionally provide other functionality. The snoop filter can provide some or all of the functionality relating to overseeing the handling of data accesses across a cache coherent system. Therefore, in some examples, the snoop filter can be considered as a cache coherency controller. In other examples, the cache coherency controller, including the snoop filter, provides an example of a cache coherency controller. The cache coherency controller and/or the snoop filter to be discussed below provide an example of control circuitry or control logic configured as discussed below.

In FIG. 3 a snoop filter 300, having the directory 310 as discussed above and a register 305 indicating those cache memories which are currently part of the coherency control arrangement (otherwise referred to as being in the coherent system or in the coherent domain) forms part of a cache coherency controller 302 associated with a transaction router 320 forming part of the data routing circuitry 60. The transaction router 320 is in data communication with one or more cache memories (of which two examples 330, 340 are shown in FIG. 3). Each cache memory has an associated agent 335, 345 responsible for the local handling of data read and write operations with respect to that cache memory.

The term "agent" is used here to encompass at least two types of arrangement. There are two types of agent in a typical coherent system, "fully coherent" and "I/O coherent". Fully coherent agents are those processing elements with a cache structure that can have data snooped from the interconnect circuitry. I/O coherent agents do not have a cache and so cannot be snooped, however they still requires to be able to read data stored in a fully coherent agent's cache.

Therefore, in the present description, reference is made to a "memory address to be accessed . . . by one of the cache memories or a coherent agent". Here, the cache memories (when part of the coherent domain are acting as fully coherent agents, and other agents referred to in this expression as "or a coherent agent" are acting as I/O coherent agents.

The snoop filter 300 handles at least a part of a process under which, when any of the data handling nodes 10 . . . 20 intends to access or modify data which is stored as a cache line in any of the cache memories, that node obtains permission to do so. As part of this process, the snoop filter 300 checks whether any other cache memories have a copy of the line which is to be modified. If any other copies are in existence at other cache memories, then those copies need to be cleared and invalidated. If those copies themselves contain modifications to the stored data in that line, then in at least some circumstances, the cache coherency controller 302 (or the snoop filter 300) instructs the cache memory to write that line back to main memory.

In the case of a read access by a node with respect to data stored in a cache memory, it is important that the node 10 . . . 20 requesting the read has access to the latest correct version of the cached data. The cache coherency controller 302 oversees this process so that if another cache has a recently-modified version of the required data, that other cache writes back the modified version and/or forwards a copy of the modified version for caching at the currently requesting node.

The cache coherency controller 302 including the snoop filter 300 therefore provides an example of a cache coherency controller configured to coordinate, amongst the cache memories, an access to a memory address by one of the cache memories when the directory indicates that another of the cache memories is caching that memory address. The snoop controller stores or provides a directory such as the directory 310 indicating, for memory addresses cached by one or more of a group of one or more cache memories connectable in a coherent cache structure, which of the cache memories are caching those memory addresses A snoop operation provides an example of sending a message to a cache memory which is indicated, by the directory, to be caching a memory address being accessed by another cache memory, and to receive a response from the cache memory which received the message, the response indicating whether that cache memory is actually caching that memory address.

In examples of a data processing system of the type shown in FIG. 1, nearly all of the checks carried out by the snoop filter 300 may be expected to miss, which is to say they would not uncover replication of data between multiple caches. But nevertheless, the checks carried out by the snoop filter 300 are essential to maintaining cache coherence. In order to improve the efficiency of the process and to allow the snoop filter 300 to avoid making checks which are definitely going to miss, the snoop filter 300 maintains the directory 310 indicating to the snoop filter 300 which data is stored at which cache. Not only does this allow the snoop filter 300 to reduce the number of snoop operations (by avoiding carrying out such operations where a particular line is not held in any cache, or is held only at the cache corresponding to the node which is currently accessing that data) it also allows data communications relating to snoop operations to be better targeted (for example as unicast or multicast communications) to the appropriate cache(s) rather than to be broadcast as data transactions to all of the caches.

Therefore, when a potential snoop operation is initiated, the snoop filter 300 consults the directory 310 to detect whether the information in question is held in one or more of the caches. If a snoop operation is indeed needed to enquire as to the current status of the data at one or more caches, then the snoop filter 300 can carry out that enquiry as a unicast or multicast communication (rather than a broadcast communication) as appropriate.

The cache coherency controller 302 including the snoop filter 300 therefore provides an example of a cache coherency controller comprising: a directory (such as the directory 310) indicating, for memory addresses cached by a group of one or more cache memories in a coherent cache structure, which of the cache memories are caching those memory addresses, the directory being associative so that multiple memory addresses map to an associative set of more than one directory entry, (in this example, the set has m entries where m is greater than one); and control logic responsive to a memory address to be newly cached, and configured to detect whether one or more of the set of directory entries mapped to that memory address is available for storage of an indication of which of the one or more cache memories are caching that memory address.

The snoop filter 300 is a so-called inclusive snoop filter which means that it has an ongoing requirement to maintain a complete listing of all data held by all of the caches which are subject to cache coherence. In order to do this, the snoop filter 300 (as part of the cache coherency controller 302) needs to be informed by an agent associated with a cache memory that a cache insertion has taken place. But in order to perform this function efficiently, it should also be informed by the agent if a cache line has been evicted (removed from) that cache memory, either as a simple deletion or invalidation (in the case of unmodified data) or as a write-back to main memory (for modified data). Signaling an eviction is the responsibility of the respective cache memory. However, some operational protocols associated with multiple caches can recommend the signaling of evictions but do not necessarily mandate it. In any case, there may be circumstances whereby a cache memory may not always be able to signal all evictions because of software errors, for example in a virtual memory system, or memory errors.

In the present description, a "silent eviction" will refer to a block or other data item being evicted from a cache without the eviction event being signaled to the snoop directory.

In order to maintain the inclusive properties of the snoop filter directory 310, an entry must be provided in the directory 310 for each stored cache line. The structure of the directory 310 will be discussed further below, but in general terms it is possible that the directory 310 becomes full, at least in respect of regions of the directory 310 appropriate for storing a newly accessed cache line. This capacity problem can be exacerbated by the issue of silent evictions as discussed above. If a silent eviction takes place, the snoop filter 300 is unable to clear the corresponding entry from the directory 310, which means in turn the directory 310 is more likely to appear to be full when a new entry is required to be written into it.

A technique used by the snoop filter 300 to handle the issue of inadequate capacity for a newly created entry is to perform so-called "back-invalidations". Here, the cache coherency controller 302 or the snoop filter 300 selects an entry in the snoop filter directory 310 to be deleted (a so-called "victim" entry) and initiates eviction of the corresponding cache line from the respective cache(s). A high rate of back-invalidations is undesirable because it generally reduces cache occupancy and therefore cache hit rate and so can lead to a performance drop and a power increase, both due to increased main memory accesses. It can also increase execution times, because main memory accesses tend to be rather slower than cache memory accesses.

Embodiments of the present disclosure provide techniques for preferentially selecting cache memories to suffer back-invalidations based upon one or more properties of those cache memories and/or data accesses by those cache memories. Further details of these techniques will be discussed below.

Figure 4:
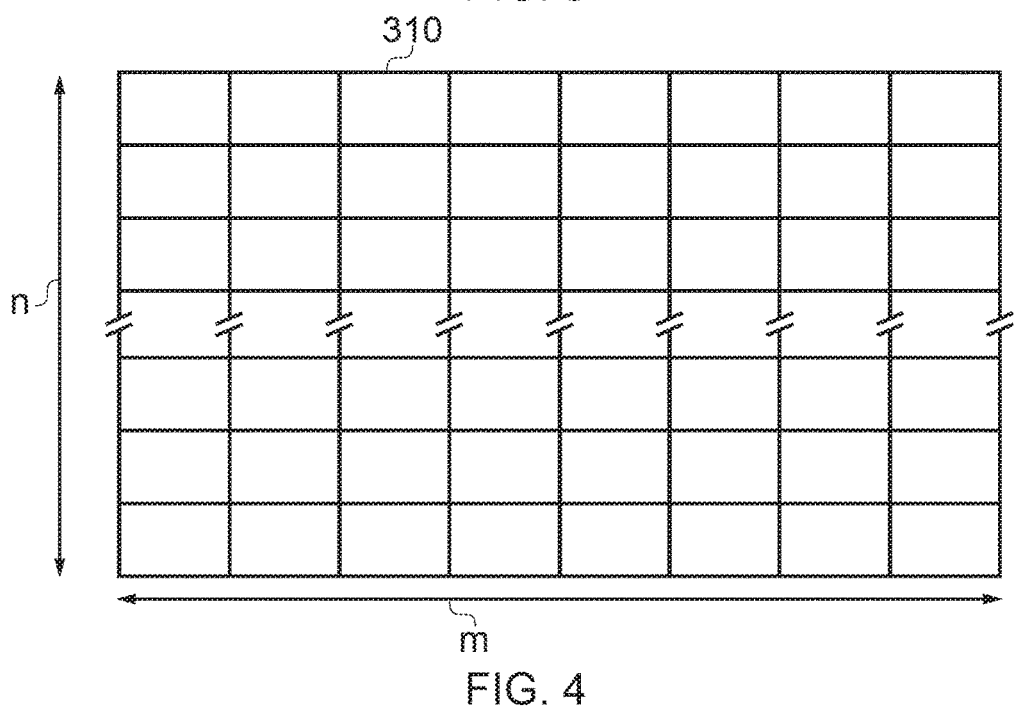
FIG. 4 schematically illustrates a snoop filter directory.

FIG. 4 schematically illustrates a snoop filter directory such as the directory 310. The snoop filter directory 310 is organised as an m-way associative group of n×m entries. Here, the number n×m of entries in the directory 310 may be set to, for example, 1.5×the total number of all cache lines in the cache coherent system. The number m of ways may be set to a lower number of ways than the associativity of each of the cache memories. Purely as an example, m could be 8 in a system having plural 16-way associative cache memories. Note that the present techniques are applicable to other associative structures such as so-called cuckoo caches.

Figure 5:
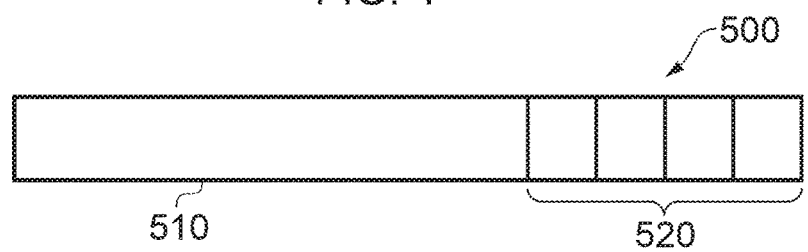
FIG. 5 schematically illustrates a snoop directory entry.

The associativity and the number of "ways" indicates that there are m possible locations for storage of any individual data item to be held by the directory 310. In the present example, the data items are referred to as snoop directory "entries", and FIG. 5 schematically illustrates a snoop directory entry 500. Accordingly, in this example, the directory provides m possible entries configured to store an indication, in respect of a particular memory address, of which cache memories are caching that memory address, where m is greater than 1. In examples, the directory is m-way associative so that multiple memory addresses map to an associative set of m directory entries. Note that in other associative structures such as structures in which the associativity is related or provided by multiple probes of the same structure, such as a so-called hash-rehash structure including a so-called cuckoo hash structure), the value m may not be fixed but may vary with operation. But at (at least) a single point in operation, the associativity provides a set of more than one directory entry as a location for a particular operation.

The snoop directory entry 500 comprises two portions: a tag 510 and a snoop vector 520.

The tag 510 forms part of the specification of which cache line (in other words, which region of the address space) is referred to by the snoop directory entry 500. In order to determine where a snoop directory entry is stored (or is to be stored) in the snoop directory 310, a part of the memory address relating to the cache line under discussion is used to select or index one of the n sets of entries of the directory 310. A remaining part of the memory address is used to generate the tag 510. For example, a number of most significant bits of the memory address may indicate which of the n sets of entries of the directory 310 the entry is to be stored in, with a further group of next-most significant bits forming the tag 510. Note here that the very least significant bits are not necessarily needed as part of a specification of the memory address of the cache line in question, because the cache line comprises data representing a number of memory addresses. For example, a cache line might comprise 8×32-bit data words, which means that the 5 least significant bits of the memory address are irrelevant to specifying the location of the cache line in the memory space.

Alternatively, a number of less significant bits could be used as the index, with a number of most significant bits forming the tag.

Hashing may be used in respect of any parts of the process discussed above, so as to introduce an irregular or pseudo-random distribution of locations in the directory 310 at which entries are stored, which in turn can avoid a problem of multiple cached structures having to be stored at adjacent indices in the directory 310.

Within a set of entries of the directory 310 selected according to the index derived from the memory address in question, an entry can be stored at any of the m "ways". When a new entry is to be stored in the directory 310, if there is a vacant way, then that way can be used to store the newly stored entry. If there are no vacant ways, then a back-invalidation process as mentioned above has to be carried out in order to provide a vacant way. This will be described in more detail below.

The snoop vector indicates which caches store the cache line defined (in address space) by the index and the tag. In the example shown in FIG. 5, the snoop vector is applicable to a system having four coherent caches and comprises four bits, each indicating (by a 1 or a 0) whether that cache line is held by a respective cache. For example, the format of the snoop vector might be as follows:

| Cache A | Cache B | Cache C | Cache D |
|---|---|---|---|
| 1 = stored, 0 = not stored | 1 = stored, 0 = not stored | 1 = stored, 0 = not stored | 1 = stored, 0 = not stored |

According to this format, a snoop vector expressed as (for example) 1001 would indicate that the cache line defined by the index and the tag is held by caches A and D, but not by caches B and C.

The bits of the snoop vector provide an example of an indication indicating, for each cache memory in the group of cache memories, whether that cache memory is currently caching that memory address, comprising a respective data item (a bit in this example) for each cache memory in the group.

The snoop filter can maintain the contents of the snoop directory, because (as part of the coherence functionality) the snoop filter (or the cache coherency controller, which includes the snoop filter) is notified of any operations by which a cache memory acquires a copy of a cache line. Normally, the snoop filter is also notified of cache evictions, but as discussed above, there can be circumstances in which evictions are not properly notified.

A snoop vector of 0000 would indicate a vacant entry in the snoop directory. The entry may remain even when the last cache holding that cache line performs an eviction, but the entry is then free to be overwritten by a newly created entry.

Of course, it should be noted that other formats could be used.

The snoop vectors discussed above provide an example of each directory entry comprising information derived from the respective cached memory address and information indicating, for each cache memory in the group of cache memories, whether that cache memory is currently caching that memory address.

Figure 6:
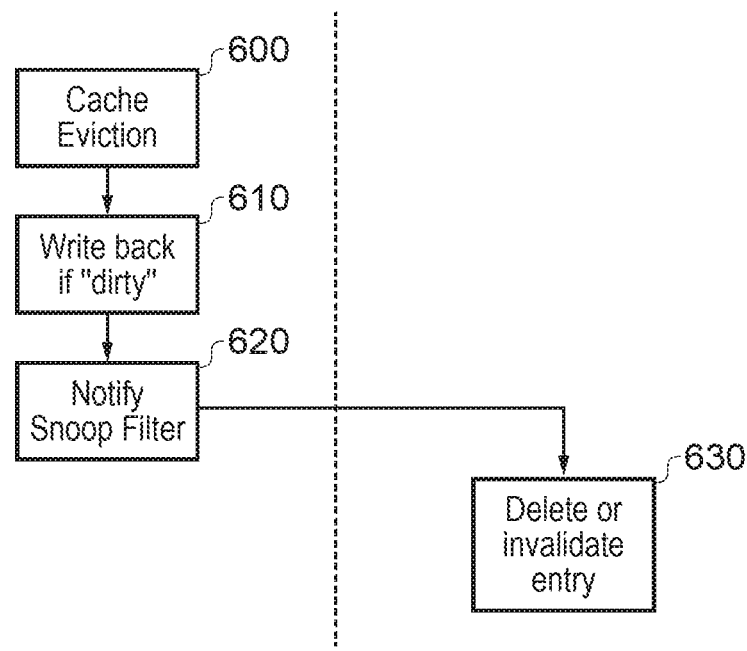
FIG. 6 is a schematic flowchart illustrating a cache eviction operation.

FIG. 6 is a schematic flow chart illustrating a cache eviction operation. Process steps are shown to the left side and the right side of a vertical broken line. Steps shown to the left side indicate matters carried out by a cache memory and/or its respective agent. Steps shown to the right side of the line indicate steps carried out by the snoop filter (as part of the cache coherency controller 302) or the cache coherency controller 302 (including the snoop filter 300) and/or the directory 310.

At a step 600, a cache eviction is initiated. There are various established reasons for requiring a cache eviction, either in response to a process carried out locally at the respective cache or in response to an instruction from the cache coherency controller 302. At a step 610, the contents of that cache line to be evicted are written back to main memory if they are "dirty", which is a term used to refer to cache line contents which have been modified with respect to the version originally retrieved from the main memory. At a step 620, the agent notifies the cache coherency controller 302 (and therefore the snoop filter) of the eviction and, at a step 630 the snoop filter deletes or at least invalidates the directory entry corresponding to that cache line at that cache. The step 630 can involve, for example, setting the relevant bit of the snoop vector corresponding to that cache line to zero.

As discussed above, if the step 620 failed to happen for any reason, the step 630 is not triggered and an unnecessary entry remains in the snoop filter directory 310.

In some example arrangements, the steps 610, 620 can be performed as a single operation.

Figure 7:
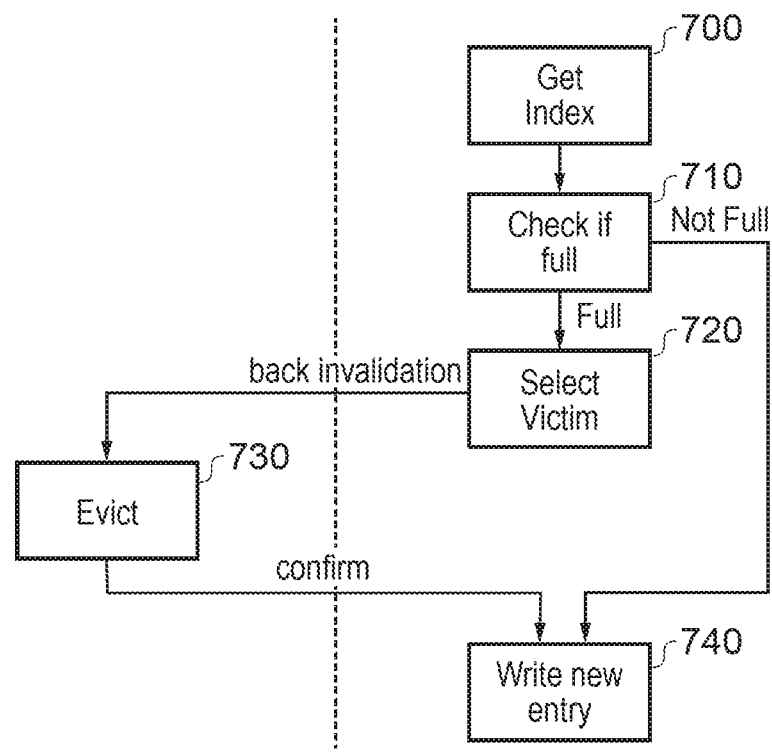
FIG. 7 is a schematic flowchart illustrating an operation to release an entry in the snoop directory.

FIG. 7 is a schematic flow chart illustrating an operation to release an entry and store a newly created entry in the snoop filter directory. This process refers to a snoop vector which is not currently held in the directory, and therefore refers to the generation of a directory entry in respect of the first of the caches to store a copy of a particular cache line.

At a step 700, an index value is derived from the address in the main memory space of the cache line to be stored in the directory 310. As discussed above, this may be part of the memory address of the cache line or may be dependent upon a hash or other value derived from that address. It indicates a set of entries (amongst n sets in the example shown in FIG. 4) of the directory the entry is to be stored in. The tag is formed, for example from a remaining part of the address of that cache line.

At a step 710, the snoop filter checks whether all of the m entries relating to that index are full, which is to say that all of the m ways for that index are occupied by currently valid data. This test is fulfilled if all of the m ways contain respective entries having snoop vectors with at least one non-zero bit (according to the example format discussed above). This is an example of the control circuitry being configured to detect, in respect of a memory address to be newly cached, whether a directory entry is available for storage of an indication of which of the one or more cache memories are caching that memory address.

If so, then at a step 720 the snoop filter 300 selects a "victim" entry to be deleted and the cache coherency controller 302 initiates a back-validation of the corresponding cache line (to the victim entry) in any cache memories in which that cache line is recorded as being stored. Operations in respect of one example cache memory is shown in FIG. 7 but there may be more than one for which a back invalidation is required. The cache memory or memories at which the corresponding cache line is stored carry out an eviction process (of the form shown in FIG. 6) with reference to that cache line and confirm having done so to the cache coherency controller 302. The snoop filter then writes the new entry to the newly vacant way at a step 740. The step 720 provides an example of which the control circuitry is configured so that when all of the set of m directory entries mapped to that memory address are occupied, the control circuitry being configured to select one of the set of m directory entries as a directory entry to be overwritten and the corresponding cached information to be invalidated, the control circuitry being configured to select a directory entry to be overwritten, from the set of m directory entries, in dependence upon which of the group of one or more cache memories is indicated by that directory entry.

Returning to the step 710, if the check carried out at the step 710 revealed that the m entries corresponding to the detected index were not all full, then control passed directly to the step 740 where the new entry was simply written to a vacant way amongst those entries.

FIG. 7 therefore provides an example of a method comprising:

storing a directory indicating, for memory addresses cached by a group of one or more cache memories in a coherent cache structure, which of the cache memories are caching those memory addresses, the directory being associative so that multiple memory addresses map to an associative set of more than one directory entry (for example, a set of m directory entries, where m is greater than one);

detecting, in response to a memory address to be newly cached, whether one or more of the set of directory entries mapped to that memory address is available for storage of an indication of which of the one or more cache memories are caching that memory address; and selecting, when all of the set of directory entries mapped to that memory address are occupied, one of the set of directory entries as a directory entry to be overwritten and the corresponding cached information to be invalidated, in dependence upon which of the group of one or more cache memories is indicated by that directory entry.

In operating according to the techniques of FIG. 7 and those to be discussed below, the snoop filter 300 (and/or the cache coherency controller 302) provides an example of control logic configured so that when all of the set of directory entries mapped to that memory address are occupied, the control logic is configured to select one of the set of directory entries as a directory entry to be overwritten and the corresponding cached information to be invalidated, the control logic being configured to select a directory entry to be overwritten, from the set of directory entries, in dependence upon which of the group of one or more cache memories is indicated by that directory entry.

Accordingly, FIG. 7 describes the back-invalidation process. A significant aspect of that process is the step 720 at which, in the case of a full set of entries in the directory 310, a victim entry is selected for deletion. In example embodiments a pseudo-random victim selection technique is used.

Figure 8:
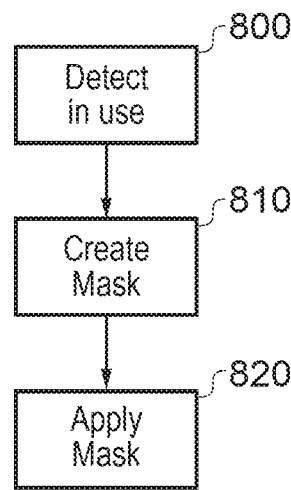
FIG. 8 is a schematic flowchart illustrating a masking process.

FIG. 8 is a schematic flow chart illustrating a masking process. This flow chart provides a high-level overview of the process, and more detail will be given in the discussion below.

At a step 800, the cache coherency controller 302 detects which of the cache memories associated with the system are currently in operation as part of a coherent domain. Cache memories can leave the coherent domain for various reasons, for example because of powering down, a change of operational status, a fault or other reasons. The cache memory can remain in operation (just not in coherent operation) or can cease operation.

The cache coherency controller 302 carries out the detection at the step 800 on an ongoing basis and maintains the results of the detection in the register 305.

For at least some cache coherent systems, the detection step 800 itself is an established part of normal operation. The present disclosure concerns techniques by which the results of that detection are used, for example in the management of the snoop filter directory 310.

At a step 810, the cache coherency controller 302 and/or the snoop filter 300 creates a so-called mask which is a representation of the status of each cache memory as detected at the step 800. In other words, the mask provides an example of status data indicating whether each cache memory in the group is currently subject to cache coherency control. The mask can be created at the step 810 from the contents of the register 305, this step taking place, for example, whenever the mask is required (see below) or whenever a change is made to the contents of the register 305.

At a step 820, the snoop filter 300 applies the mask to snoop vectors in a manner to be described below, so as to take into account, in the detection of a directory entry relating to a memory address to be accessed, only those cache memories in the group of cache memories which are subject currently to cache coherency control. Applying the mask in this way provides an example of the control circuitry being configured, in response to the status data, to apply a filter to the information in a directory entry indicating for each cache memory in the group of cache memories, whether that cache memory is currently caching that memory address, so as to pass only those indications relating to cache memories which are currently subject to cache coherency control.

Figure 9:
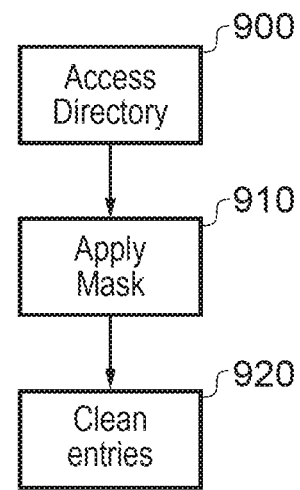
FIG. 9 is a schematic flowchart illustrating detail of a masking process.

FIG. 9 is a schematic flow chart illustrating a masking process in more detail. At a step 900 the snoop filter 300 accesses the directory 310 and, in respect of one or more directory entries, detects the snoop vector associated with those directory entries.

At a step 910, the snoop filter 300 applies the mask to the snoop vectors. This allows the snoop filter 300 to disregard, in the detection of which cache memories are caching a memory address to be accessed, any indications in the respective directory entry (for example, in the snoop vector) relating to a memory address to be accessed, of a cache memory which is not currently subject to cache coherency control.

At a step 920, the snoop filter 300 and/or the cache coherency controller 302 "cleans" any directory entries found to refer to cache memories which are no longer subject to cache coherency control. In an example, to be discussed below, this can involve preparing a replacement snoop vector which omits any information previously held by that snoop vector which related to a cache memory no longer subject to cache coherency control.

Figure 10:
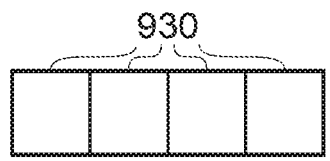
FIG. 10 schematically illustrates an example mask.

FIG. 10 schematically illustrates an example mask. This mask follows the snoop vector format discussed above, in that (as drawn) the four data bits 930 of the mask represent the cache memories A . . . D respectively, in order from left to right as drawn. Each of the data bits 930 indicates, for the respective cache memory, whether that cache memory is currently under cache coherency control. For example, a "1" can indicate that the respective cache memory is currently under cache coherency control, and a "0" can indicate that the respective cache memory is not under cache coherency control. So an example mask indicating that cache memories A, C and D are currently under cache coherency control might be:

| 1 | 0 | 1 | 1 |
|---|---|---|---|

It will be appreciated that the specific choice of polarity or number of bits of the indications is a routine design choice and that alternative representations may be used, for example a "0" could indicate that the respective cache memory is currently under cache coherency control, and a "1" could indicate that the respective cache memory is not under cache coherency control. These choices could affect, for example, the type of logic to be discussed in connection with FIG. 11 below. However, in the present discussion the example format discussed in connection with FIG. 10 will be used.

Figure 11:
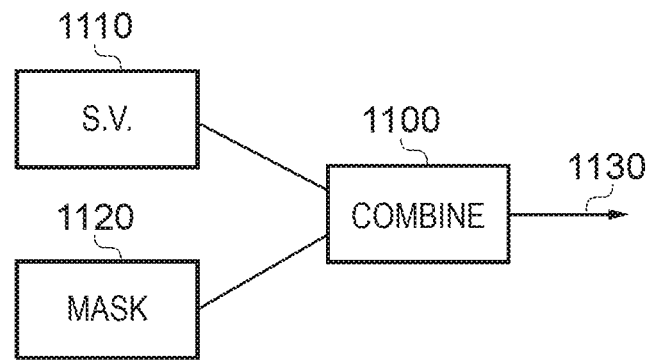
FIG. 11 schematically illustrates circuitry for applying a mask.

FIG. 11 schematically illustrates example circuitry for applying the mask, the circuitry comprising a logical combiner 1100 which combines respective bits of the snoop vector 1110 and the mask 1120 to generate an output 1130.

The circuitry of FIG. 11 provides a logical combination of the mask and a snoop vector such that the output or result 1130 provides the normal snoop vector indications (is the data held at that cache?) in respect of cache memories which are currently subject to cache coherency control, but for any cache memories not currently subject to cache coherency control, the indication is set to indicate "not currently stored at that cache memory". The operation of the logical combiner 1100 provides an example of passing only those data items corresponding to cache memories which are currently subject to cache coherency control. In examples, each data item (of the snoop vector) comprises one data bit; and a logical combination is used of the data bits corresponding to the group of cache memories with a set of data bits each indicating whether a respective cache memory is currently subject to cache coherency control.

There are various reasons why a snoop vector could remain in the directory 310 indicating that a cache memory, no longer subject to cache coherency control, retains a copy of particular data, even though that information is in fact no longer relevant to the snoop filter operation. For example, a cache memory could leave the coherent domain because of an instantaneous failure, such that the cache memory does not have the opportunity to signal evictions to the cache coherency controller. Or the action of a cache memory leaving the coherent domain could in fact be arranged not to cause the snoop filter to pre-emptively remove entries relating to that cache memory, because to do so as a single operation would be potentially very processor-intensive for the snoop filter and/or the cache coherency controller. Instead, the present techniques allow the snoop directory 310 to be cleaned of snoop vector information relating to cache memories no longer in the coherent domain on an index-by-index or entry-by-entry basis, as those indices or entries are next accessed.

So, the output of the logical combiner 1100 can be used in various ways, at least some of which will be described below with reference to FIG. 12.

For example, whenever a snoop vector is accessed, the mask can be applied so as to remove any logical "1"s (in the example notation used in this description) relating to cache memories no longer in the coherent domain. If this changes the snoop vector, then the entry can be modified so as to reflect the new (masked) snoop vector.

A first example is as follows.

| Mask | 1 | 0 | 1 | 1 |
| Snoop vector | 1 | 1 | 0 | 0 |
| New snoop vector | 1 | 0 | 0 | 0 |

This operation results in an output (new) snoop vector as the output 1130 which still indicates that the relevant data is held by a cache memory subject to cache coherency control. The new snoop vector can, for example, be written to that directory entry to replace the previous snoop vector.

A second example is as follows.

| Mask | 1 | 0 | 0 | 1 |
| Snoop vector | 0 | 1 | 0 | 0 |
| New snoop vector | 0 | 0 | 0 | 0 |

This operation similarly results in an output (new) snoop vector as the output 1130 which indicates that the relevant data is no longer held by a cache memory subject to cache coherency control. The new snoop vector can, for example, be written to that directory entry to replace the previous snoop vector. Or the snoop directory entry can simply be deleted.

Both of these examples represent example instances of the step 920 discussed above. The control circuitry (of the snoop filter 300 and/or the cache coherency controller 302) is configured to generate a replacement directory entry based only on those cache memories in the group which are currently subject to cache coherency control.

In another example use of the mask, the masked snoop vector can be useful in selecting a victim entry for back invalidation (the step 720 above). The step 720 is needed if a new entry needs to be written to a set of entries of the directory 310 which are full.

For example, consider a situation in which one or more entries in the relevant set of entries are such that, when combined with the mask, the entry has a masked snoop vector indicating that the relevant data is no longer held by a cache memory subject to cache coherency control, for example:

| Mask | 1 | 0 | 0 | 1 |
| Snoop vector | 0 | 1 | 0 | 0 |
| New snoop vector | 0 | 0 | 0 | 0 |

In this example situation, the directory entry having a masked snoop vector indicating that the relevant data is no longer held by a cache memory subject to cache coherency control can be treated as unoccupied for the purposes of finding a location to store a newly required entry in that set of entries (at that index). In the context of the flowchart of FIG. 7 this can mean either:

(a) allowing control to pass as far as the step 720 but then setting that directory entry as a victim entry (avoiding the normal victim selection procedure); or (b) applying the mask at the step 710 so that the "not full" path is followed from the step 710 to the step 740 in respect of that entry.

Even in the case of a masked snoop vector which, after applying the mask, still indicates that the relevant data is held by one or more caches, the victim selection step 720 can take the masked snoop vector (rather than the original snoop vector) into account in selecting a victim entry. For example, if victim selection is based upon a round-robin or pseudo-random selection of cache memories, the information in the masked snoop vector can be used in the selection process.

Figure 12:
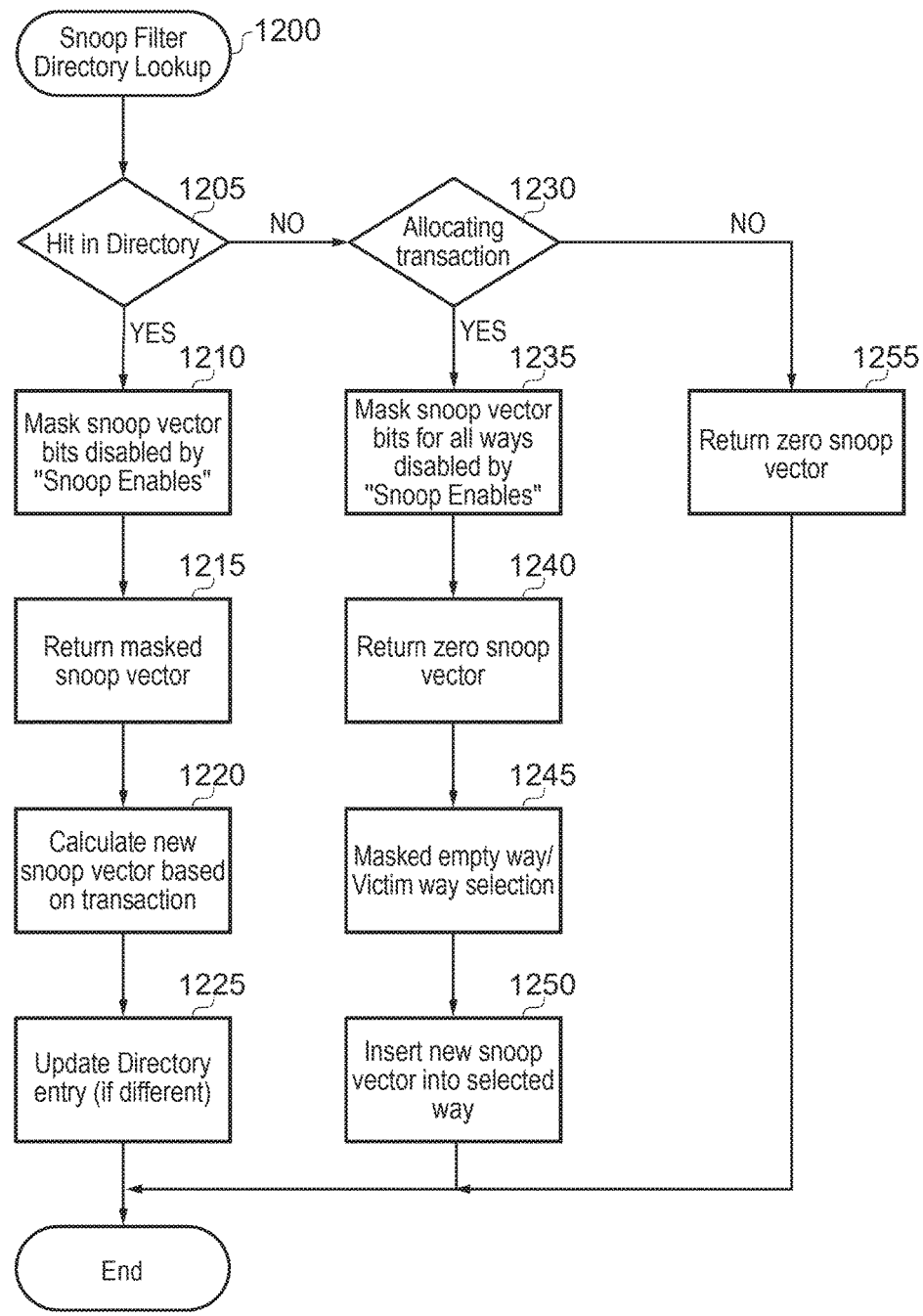
FIG. 12 is a schematic flowchart illustrating a snoop process.

FIG. 12 is a schematic flow chart illustrating a snoop process and in particular that part of the process which starts with a snoop filter directory look up.

As discussed above, a directory look-up is a first step carried out when a cache memory or other coherent agent requires to access a memory address. The snoop filter 300 checks the directory 310, an inclusive directory, for information to indicate whether that memory address is currently cached by any of the cache memories forming part of the coherent system. However, as discussed above, in the case of a cache memory which is associated with the cache coherency controller and the snoop filter such that it can form part of the coherent domain, but it currently is not subject to cache coherency control, such a cache memory may still be referred to in entries in the directory such that those entries indicate that the cache memory stores particular data items. Whether or not the cache memory does in fact still store those data items, the fact that the cache memory is no longer subject to cache coherency control means that it is irrelevant to the snoop operation whether it stores or does not store those data items. So, the mask discussed above can be used to disregard that information.

Referring to FIG. 12, the snoop filter directory look-up is initiated at a step 1200. At a step 1205 a detection is made as to whether the currently accessed address provides a hit in the directory. In other words, the snoop filter 300 detects whether the directory 310 already contains an entry for which the index and tag correspond to the currently accessed address. If the response is "yes" then control passes to a step 1210. If the answer is "no" then control passes to a step 1230 to be discussed below.

At the step 1210, the snoop vector for the directory entry which formed the hit is read and is masked by the logic shown in FIG. 11 (for example). At a step 1215 a masked snoop vector representing the output 1130 from FIG. 11 is returned. As discussed above, the effect of the masking is to remove any data bits in the snoop vector corresponding to cache memories associated with the cache coherency controller and the snoop filter but which are no longer part of the cache coherency domain.

At a step 1220 a new snoop vector is calculated or generated based on the current memory access transaction. As discussed above, this could involve removing some cache memories from the group which are currently caching that memory address and/or adding a cache memory to the group currently caching that memory address. The directory entry is updated at a step 1225 if it is different to the previous directory entry for that memory address, and the process (at least in so far as it relates to accessing the snoop vector in the directory) ends. The memory access transaction is performed as normal, but based upon the masked snoop vector returned at the step 1215.

Returning to the step 1230, which is executed if a directory hit was not detected at the step 1205, a test is carried out by the snoop filter and/or the cache coherency controller as to whether the current memory access is a so-called allocating transaction. This refers to a memory access which will result in a copy of that memory address being held in a cache memory, where no copy was held previously (note that the "no" outcome from the step 1205 indicated that no previous copy was held). If the answer is "no" then control passes to a step 1255 at which a zero snoop vector is returned and the process ends.

If, however, the response to the step 1230 is "yes" then at a step 1235 the snoop vector to be written as part of the allocating transaction is masked as discussed above. At this step, it is noted that when a tag is looked up in the snoop directory, the snoop vectors for all m ways are returned (for example, in parallel) and the mask is applied to all of these in parallel to determine the snoop vectors for those caching agents currently in the coherent domain. At a step 1240 a zero snoop factor is returned.

At a step 1245, if the set of entries of the directory are found to be all full (at the step 710 described above) then a victim entry is selected (corresponding to the step 720, but using masked snoop vectors as discussed above). If the set of entries are detected not to be all full on the basis of the masked snoop vectors (as described above) then a vacant way is selected for writing the new entry.

In other words, for a directory entry occupied only by one or more cache memories which are not currently subject to cache coherency control, the snoop filter is configured to treat that directory entry as unoccupied. On the other hand, if all of the directory entries are occupied, even taking into account the use of the mask to disregard snoop vectors which only relate to cache memories not currently subject to cache coherency control, then a victim way is selected for overwriting. Again, the mask is used in the selection of a victim way such that any directory.

Finally, at a step 1250, the newly written snoop vector is inserted into the selected way and the process ends.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

What is claimed is:

1. A cache coherency controller comprising:
a directory indicating, for memory addresses cached by one or more of a group of one or more cache memories connectable in a coherent cache structure, which of the cache memories are caching those memory addresses; and
control circuitry configured to detect a directory entry relating to a memory address to be accessed so as to coordinate, amongst the cache memories, an access to a memory address by one of the cache memories or a coherent agent in instances when the directory entry indicates that another of the cache memories is caching that memory address;
the control circuitry being responsive to status data indicating whether each cache memory in the group is currently subject to cache coherency control so as to take into account, in the detection of the directory entry relating to the memory address to be accessed, only those cache memories in the group which are currently subject to cache coherency control.

2. A cache coherency controller according to claim 1, in which the control circuitry is responsive to the status data indicating whether a cache memory in the group is currently subject to cache coherency control so as to disregard, in the detection of which cache memories are caching the memory address to be accessed, any indications in the respective directory entry relating to the memory address to be accessed, of a cache memory which is not currently subject to cache coherency control.

3. A cache coherency controller according to claim 1, in which the control circuitry is configured to generate a replacement directory entry based only on those cache memories in the group which are currently subject to cache coherency control.

4. A cache coherency controller according to claim 1, in which the directory provides m possible entries configured to store an indication, in respect of a particular memory address, of which cache memories are caching that memory address, where m is greater than 1.

5. A cache coherency controller according to claim 4, in which the directory is m-way associative so that multiple memory addresses map to an associative set of m directory entries.

6. A cache coherency controller according to claim 4, in which the control circuitry is configured to detect, in respect of a memory address to be newly cached, whether a directory entry is available for storage of an indication of which of the one or more cache memories are caching that memory address.

7. A cache coherency controller according to claim 4, in which the control circuitry is configured so that when all of the set of m directory entries mapped to that memory address are occupied, the control circuitry is configured to select one of the set of m directory entries as a directory entry to be overwritten and the corresponding cached information to be invalidated, the control circuitry being configured to select a directory entry to be overwritten, from the set of m directory entries, in dependence upon which of the group of one or more cache memories is indicated by that directory entry.

8. A cache coherency controller according to claim 7, in which, for a directory entry occupied only by one or more cache memories which are not currently subject to cache coherency control, the control circuitry is configured to treat that directory as unoccupied.

9. A cache coherency controller according to claim 1, in which each directory entry comprises information derived from the respective cached memory address and information indicating, for each cache memory in the group of cache memories, whether that cache memory is currently caching that memory address.

10. A cache coherency controller according to claim 9, in which the control circuitry is configured, in response to the status data, to apply a filter to the information in a directory entry indicating for each cache memory in the group of cache memories, whether that cache memory is currently caching that memory address, so as to pass only those indications relating to cache memories which are currently subject to cache coherency control.

11. A cache coherency controller according to claim 10, in which the indication indicating, for each cache memory in the group of cache memories, whether that cache memory is currently caching that memory address, comprises a respective data item for each cache memory in the group.

12. A cache coherency controller according to claim 11, in which the filter is configured to pass only those data items corresponding to cache memories which are currently subject to cache coherency control.

13. A cache coherency controller according to claim 12, in which:
    each data item comprises one data bit; and
    the filter comprises a logical combination of the data bits corresponding to the group of cache memories with a set of data bits each indicating whether a respective cache memory is currently subject to cache coherency control.

14. A cache coherent data communication device comprising a cache coherency controller according to claim 1.

15. A memory system comprising:
a cache coherent data communication device according to claim 14; and
a group of one or more cache memories each connected to the cache coherent data communication device.

16. A cache coherency controller comprising:
means for storing a directory indicating, for memory addresses cached by one or more of a group of one or more cache memories connectable in a coherent cache structure, which of the cache memories are caching those memory addresses; and
means for detecting a directory entry relating to a memory address to be accessed so as to coordinate, amongst the cache memories, an access to a memory address by one of the cache memories or a coherent agent in instances when the directory entry indicates that another of the cache memories is caching that memory address;
the means for detecting being responsive to status data indicating whether each cache memory in the group is currently subject to cache coherency control so as to take into account, in the detection of the directory entry relating to the memory address to be accessed, only those cache memories in the group which are currently subject to cache coherency control.

17. A method comprising:
storing a directory indicating, for memory addresses cached by one or more of a group of one or more cache memories connectable in a coherent cache structure, which of the cache memories are caching those memory addresses; and
detecting a directory entry relating to a memory address to be accessed so as to coordinate, amongst the cache memories, an access to a memory address by one of the cache memories or a coherent agent in instances when the directory entry indicates that another of the cache memories is caching that memory address;
the detecting step being responsive to status data indicating whether each cache memory in the group is currently subject to cache coherency control so as to take into account, in the detection of the directory entry relating to the memory address to be accessed, only those cache memories in the group which are currently subject to cache coherency control.

* * * * *